United States Patent [19]
Kieffer

[11] Patent Number: 5,767,607
[45] Date of Patent: Jun. 16, 1998

[54] WEIGHT OPTIMIZED ROTORS

[75] Inventor: Vernon E. Kieffer, St. Louis, Mo.

[73] Assignee: Emerson Electric Co., St. Louis, Mo.

[21] Appl. No.: 757,157

[22] Filed: Nov. 27, 1996

[51] Int. Cl.$^6$ .................... H02K 1/06; H02K 1/20
[52] U.S. Cl. .................... 310/261; 310/60 A; 310/61; 310/193; 310/216
[58] Field of Search .................... 310/61, 211, 212, 310/216, 261, 262, 193, 59, 60 R, 60 A

[56] References Cited

U.S. PATENT DOCUMENTS

| | | | |
|---|---|---|---|
| 3,030,528 | 4/1962 | DeJean | 310/42 |
| 3,210,584 | 10/1965 | Jorgensen et al. | 310/265 |
| 4,118,153 | 10/1978 | Stannow et al. | 417/363 |
| 4,282,451 | 8/1981 | Bratoljic | 310/262 |
| 4,410,820 | 10/1983 | Stanley | 310/216 |
| 4,434,546 | 3/1984 | Hershberger | 29/598 |
| 4,712,034 | 12/1987 | Iwasaki | 310/217 |
| 4,782,260 | 11/1988 | Gandhi et al. | 310/216 |
| 4,795,936 | 1/1989 | Crosetto et al. | 310/156 |
| 4,841,186 | 6/1989 | Feigel et al. | 310/156 |
| 4,888,513 | 12/1989 | Fratta | 310/215 |
| 5,153,475 | 10/1992 | McSparran | 310/254 |
| 5,173,629 | 12/1992 | Peters | 310/216 |
| 5,349,741 | 9/1994 | Neuenschwadner | 29/598 |
| 5,410,200 | 4/1995 | Sakamoto et al. | 310/49 |
| 5,471,101 | 11/1995 | Hein | 310/42 |
| 5,578,878 | 11/1996 | Hall | 310/51 |

FOREIGN PATENT DOCUMENTS 93-276697 of 1993 Japan .................... 310/261

*Primary Examiner*—Steven L. Stephan
*Assistant Examiner*—Tran N. Nguyen
*Attorney, Agent, or Firm*—Howell & Haferkamp, L.C.

[57] ABSTRACT

A substantial saving of material cost and weight is obtained in an induction motor by a rotor including two sets of differently punched laminations. The laminations in one of the two groups each weigh less than 95% of the laminations in the other one of the two groups. Such laminations can be automatically produced on a computer-controlled die press by providing a separate punch pattern that is capable of being programmed for selected laminations. The lighter laminations can be used to counterbalance a crank without requiring additional counterbalancing weight to be added outside the motor.

18 Claims, 7 Drawing Sheets

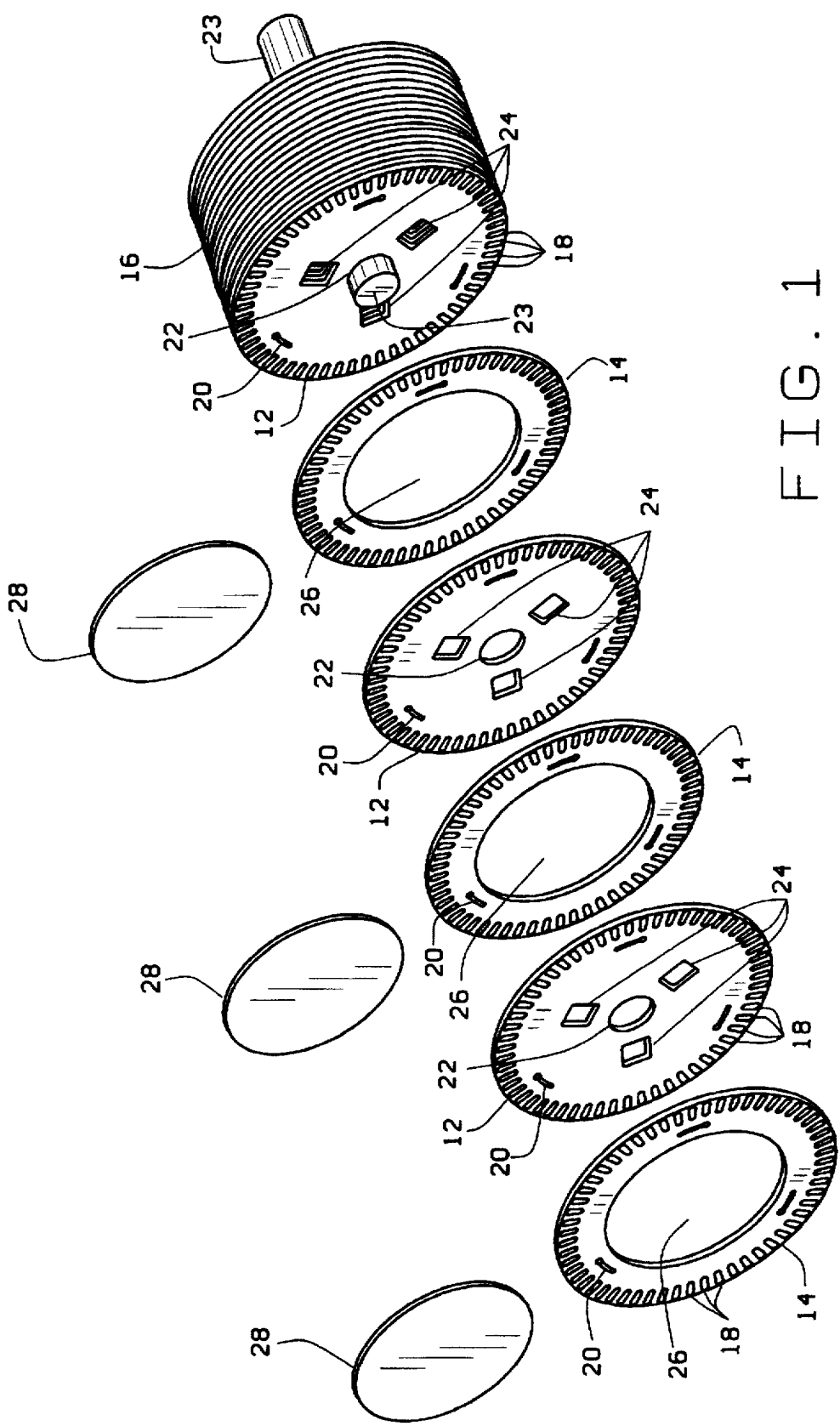

WEIGHT OPTIMIZED ROTORS

BACKGROUND OF THE INVENTION

(1) Field of the Invention

This invention relates generally to the field of electric motors, and more specifically to reduced weight electric motors, such as inductive electric motors, in which the weight of the rotor has been reduced, and to the rotor so constructed to reduce the weight of such a motor.

(2) Description of the Prior Art

Reducing the weight of a rotor in some types of motors by reducing the amount of material therein is known. The advantages of such savings usually include a reduction in manufacturing cost of the motor. In the past, many of the advances made in reducing the weights of laminations in rotors have been developed for DC motors. However, many of the applications in which reduced-weight motors would be useful, such as washing machines, employ induction motors, to which the improvements developed for DC motors either do not apply or would be impractical to apply.

Recent developments have been set forth for reducing the weight of rotors in induction motors, but these weight reductions required that the rotors be redesigned, resulting in a smaller motor of different dimensions than the original. Thus, a manufacturer of such a motor would have to retool his manufacturing operation to accommodate the smaller-size rotor. Moreover, a manufacturer of a device, such as a washing machine, in which a standard motor is used may have to retool to accommodate a lower-weight motor having smaller external dimensions. The marketplace for improved lightweight motors may also be reduced if an existing consumer appliance needing repair cannot accommodate a smaller, reduced weight motor, and consumer hostility may be created if the cost of a repair is increased because a replacement motor requires an extra-cost adaptor.

There are also some applications of induction motors in which an axial imbalance (such as that created by attachment of the motor to a crank, as in a reciprocating compressor) must be counterbalanced. Presently, this counterbalance is created by the axially asymmetric addition of extra weight 102 on one, or perhaps both shorting end rings 100 of a motor, as shown in prior art FIG. 9A and 9B, or by the addition of counterweights external to the motor, since the prior art has taught that the rotor of a motor should be made as symmetrical as possible. Adding additional material in the form of counterbalancing weights adds to the cost of the motor or motor assembly. There has thus been a long-felt need to provide a reduced-weight, and thus reduced cost motor for such applications, and a method for reducing the weight and cost of such motors.

It would thus be advantageous to provide a rotor for an induction motor that can be practically constructed with existing manufacturing equipment, but which provides a substantial reduction in weight through reduction in lamination material. It would further be advantageous if the reduction in weight was not accompanied by a reduction in size, so that a replacement motor made with such a rotor could maintain the same external dimensions as the motor being replaced.

It would also be advantageous to provide a rotor for an induction motor, and a method of manufacturing such a rotor, that would permit the motor to be used in applications in which an axial asymmetry must be counterbalanced, without adding or attaching significant additional weight to the motor.

SUMMARY OF THE INVENTION

The invention, in a basic form, therefore comprises a laminated rotor for an induction motor, the rotor having a shaft with a center axis and a set of axially-mounted laminations. The laminations are constructed of a ferro-magnetic material. Each of the laminations has an outer periphery, a set of conductor slots near the outer periphery, a set of interlocks spaced from the conductor slots, and a central hole. The set of laminations is divided into at least two groups of differently punched laminations, in which each of the laminations of the second group has a lesser weight than that of the laminations in the first group, because of different punch patterns in the laminations. This difference changes the weight of the laminations without otherwise changing the outer diameter (or perimeter) or thickness of the laminate.

According to another aspect of the invention, one or more of the laminations in a rotor may have a center of gravity substantially offset from the axis of the shaft because of asymmetrical punching of at least some of the laminations.

It is therefore an object of the invention to provide a rotor of substantially reduced weight for an electric motor.

It is a further object of the invention to provide a rotor of substantially reduced weight that can practically be constructed with existing manufacturing equipment without retooling.

It is yet a further object of the invention to provide a reduced weight induction motor without a concomitant change in the size of the motor, so that the motor of reduced weight can maintain the same external dimensions of the motor being replaced.

It is still another object of the invention to provide an induction motor and method of making same that internally compensates for an axial imbalance introduced by an apparatus attached to its shaft.

These and other objects of the invention will become apparent to one skilled in the art upon reading the detailed description of the invention below.

BRIEF DESCRIPTION OF THE DRAWINGS

FIG. 1 is an exploded perspective drawing of a stack of laminations according to one preferred embodiment of the invention;

FIGS. 2A and 2B are views of a stack of laminations comprising a rotor in accordance with a second preferred embodiment of the invention, wherein FIG. 2A is a staggered cross-sectional view and FIG. 2B is a top plan view;

FIGS. 3A and 3B are views of a stack of laminations comprising a rotor in accordance with a third preferred embodiment of the invention, wherein FIG. 3A is a staggered cross-sectional view and FIG. 3B is a top plan view;

FIGS. 4A and 4B are views of a stack of laminations comprising a rotor in accordance with a fourth preferred embodiment of the invention, wherein FIG. 4A is a staggered cross-sectional view and FIG. 4B is a top plan view;

DETAILED DESCRIPTION OF THE PREFERRED EMBODIMENTS

Figure 2A:
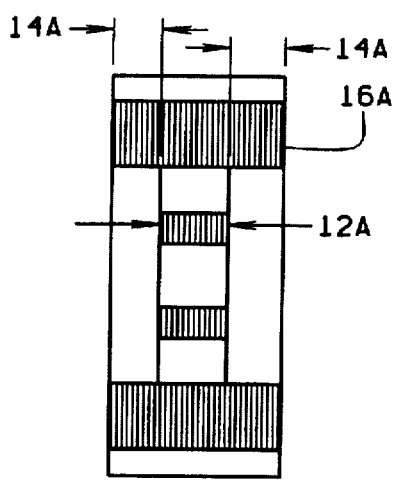

FIG. 1 shows a detailed exploded view of a stack of laminations comprising a reduced-weight rotor for an induction motor in accordance with one preferred embodiment of the invention.

The rotor comprises laminations 12, 14 of a magnetic material having different punched cross sections. Of the two types of laminations, lamination 12 corresponds more closely with laminations in common use today. Lamination 12 comprises a series of slots 18 spaced adjacent the outer perimeter of the lamination to receive a rotor winding (not shown), typically a squirrel cage winding with shorting end rings on both sides of the lamination stack, the end rings optionally including fan blades (all of which are omitted from FIG. 1). Lamination 12 also has a center hole 22, which is dimensioned to receive a shaft 23 adapted to receive the rotor laminations for mounting thereon. A plurality of optional vent holes 24 may be spaced symmetrically about the lamination. A plurality of interlocks 20 are also provided. Vent holes 24 provide a way to allow air heated by the motor to rise through or otherwise circulate from heated regions of the motor, but would be omitted in a hermetic motor. Slots 18 are preferably skewed, i.e., in a stack of laminations 16, corresponding slots 18 in successive laminations are slightly rotated about the axis of the rotor. This skewing gives the motor a starting direction when power is applied. As the rotor laminations are punched by, e.g., a Minster model P2-200 punch press (Minster Machine Co., Minster, Ohio) in conjunction with an LH Controls PDC-V™ die controller and LH Carbide lamination die with Autolok™ (part of the LH Carbide Autolok™ System from LH Carbide Corp., Ft. Wayne, Ind.), the laminations are collected and stacked.

Typically, the laminations 12 are skewed in the press as they are collected. Collection is generally accomplished using a squeeze ring (not shown), which holds the punched-out laminations. The barrel of the squeeze ring is rotated between punchings to generate the skew.

Interlock tabs 20 hold the laminations (or "lam") together in a precise skew attitude when they are stacked. Many standard motors are punched with stacks of laminations that are all very much like lamination 12, perhaps because it has been believed that full or nearly full lamination plates are necessary for induction motors.

It has been discovered by the inventors, however, that the elimination of much of the central portion of a lamination is possible without any substantial reduction in motor efficiency, and that much of the reduction can be made asymmetric to counterbalance asymmetry in a load, such as a crank. Indeed, it has been found, in a particular case, that the efficiency of a four-pole/six-pole multispeed induction motor is actually increased by reducing its weight by providing some laminations 14 in the stack 16 of laminations with substantially reduced weight, e.g., at least about 5% less than laminations 12 10 (i.e., individual ones of laminations 14 have a weight 95% or less than that of individual laminations 12), assuming that the material used for the lamination 14 is substantially the same thickness and composition as that used for laminations 12. The laminations 14 may have a weight about 25% less than laminations 12 (i.e., individual ones of laminations 14 may have a weight 75% or less than that of individual laminations 12). Similar results may be expected for other induction motors having two or more poles.

The punching of laminations 12 proceeds in several steps, with the center hole 22 often being punched before the other holes. However, the LH Carbide die controller is capable of being programmed to provide a different punch pattern for selected laminations, such as laminations 14 in FIG. 1. For these laminations, a much larger center hole 26 is punched out. This center hole 26 may be so large as to encompass the region in which vent holes 24 are punched, as is shown in FIG. 1, to provide a significant savings of material. In fact, it has been determined that, for washing machine motors having four poles, laminations 14 can be made 30% or more lighter than laminations 12, with the limitations being primarily that the outer perimeter of center hole 26 should be at least about ⅛ inch from the interlocks 20, and the interlocks 20 should be at least about ⅛ inch from the innermost portion of slots 18 to provide sufficient mechanical strength to the laminations 14 to allow them to be stacked and assembled automatically. Of course, in the arrangement shown in FIG. 1, it is the interlocks 20 that must be used to provide skew to the lamination stack 16, since there are no separate vent holes 24 in laminations 14 that could be used for skewing. The material 28 that is punched from laminations 14 from the larger central hole 26 may be recycled or sold for scrap. It is anticipated that the invention can be applied to motors of all sizes, although the cost and material savings may be proportionately less for micromotors than for larger motors.

For a particular rotor having fifty-three laminations, thirty-three of which are of the type of lamination 14 (i.e., with an enlarged counterbore) and twenty of which are of the type of lamination 12 (i.e., the laminations contact the shaft), the savings have been quantified as follows. In a case in which the larger central hole 26 is enlarged from a diameter of 0.625" to a diameter of 1.657", the weight of the material punched from 0.031" stock for the 33 laminations of type 14 was calculated to be 0.6239 lbs., assuming a material density of 0.283 lb/in$^3$. The weight and material savings is calculated by subtracting the weight of the 0.625" diameter shaft holes that would otherwise have been punched (0.0888 lbs) and the weight of the slots 24 that are subsumed within the center hole 26 (approximately 0.0715 lbs.). The net reduction in weight of the rotor is thus 0.4636 lbs. In the case of a 2.500" diameter center hole 26, the material saved increases to 1.4204 lbs., minus the same amounts for the shaft holes and slots, for a net savings of 1.1886 lbs. Of course, this extra material can be reclaimed as scrap. The larger central hole does not have to be precision punched (since it does not contact the shaft), which results in fewer rejected laminations and die pulls. An incidental saving is the reduced cost of energy for burn off and shrink, i.e., to break the bond between a cast aluminum squirrel cage and the laminations, as described below. By controlling the weight of the motor in accordance with this invention, it would also be possible to control the natural frequency of the rotor assembly, reduce motor vibration, and lessen handling fatigue.

The stack of laminations 16 comprising the rotor should include sufficient numbers of laminations 12 that have center holes 22 adapted to contact the rotor shaft 23 to provide safety and stability to the finished rotor assembly. It has been determined, for typical washing machine motors, that about fourteen laminations of the type of lamination 12 in stack 16 are useful to provide stability, although other numbers of shaft-contacting laminations may be used. For greater stability, twenty laminations of the type of lamination 12 may be used, or for an even larger stability margin, twenty-eight are even more preferable. Less than fourteen laminations of the type of lamination 12 may also be used, and may also provide satisfactory stability, so fourteen is not to be interpreted as a minimum number of shaft-contacting laminations needed for satisfactory stability. Instead, this number is given to provide a starting point for rotor design. An actual minimum number of shaft-contacting laminations would vary depending upon such factors as the size and speed of the motor, and in some cases, even a single shaft-contacting lamination may be sufficient.

The interlock tabs 20 hold laminations 12, 14 together in the stack 16 prior to die casting, which forms a squirrel cage winding through slots 18. Typically, the squirrel cage is formed with cast aluminum, with shorting rings on either side of the stack 16. Fan blades may optionally be included on the shorting rings. The rotor core assembly (including the die-cast aluminum cage) is then preferably heated and quenched to break the bond from the aluminum to the steel, as would be known to one skilled in the art. Shaft 23 is typically inserted through the stack of rotors after die casting.

Figure 9A:
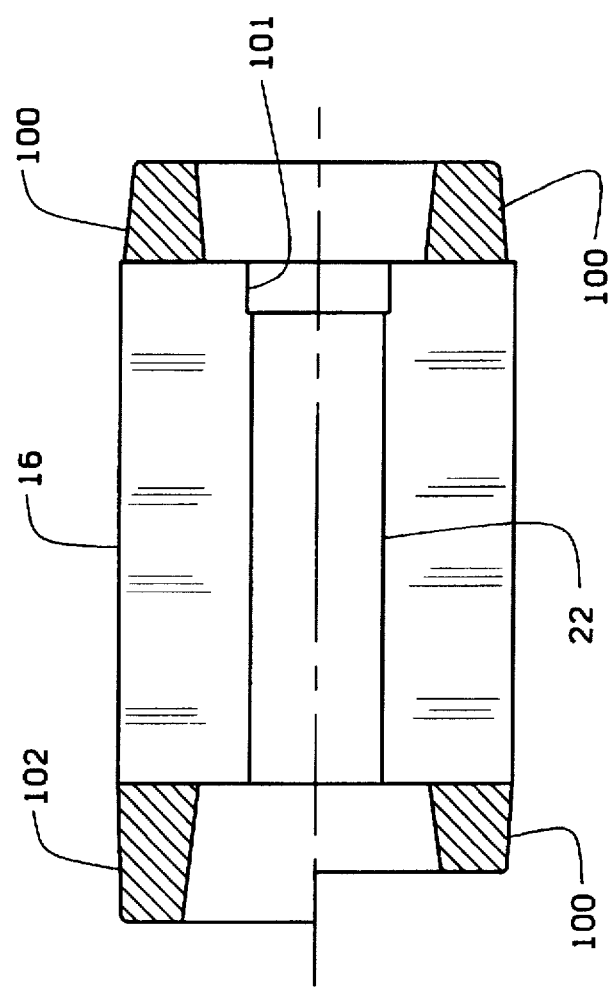
FIGS. 9A and 9B are, respectively, a cross-sectional view of a prior art rotor and a side plan view of the same rotor showing how axial imbalance is presently compensated.
Figure 9B:
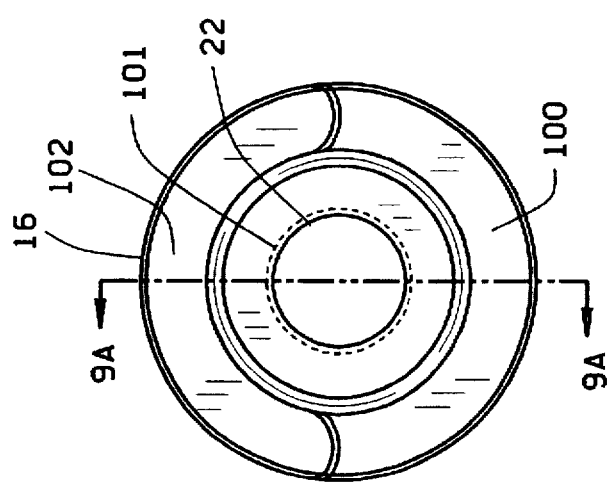

The amount of material 28 that is saved by practicing the invention can be substantial. Some prior art rotor designs call for making all laminations in stack 16 in accordance with lamination 12, but with a few outermost laminations 12 having very slightly larger holes 22, the amount by which these holes have been enlarged has heretofore been no more than about 0.060" in increased diameter, because this amount has heretofore been dictated by the necessity for a shaft to enter the holes 22 after they have shrunk slightly because of the heating of the outer regions of the laminations during casting. Some slight counterboring, such as counterbore 101 in FIGS. 9A and 9B has also been done at ends laminations to get bearings closer to the center of a rotor for maximum support. However, the present invention can use holes 26 of much larger size, and can provide much larger weight savings because many of the laminations 14 with larger holes 26 can be placed not just at the ends, but also in the middle of stack 16. Indeed, the laminations 14 may all be placed in the middle of stack 16, with standard laminations 12 at the outer ends, so that the same fixture used to assemble conventional laminations on a rotor shaft may be used to hold the rotor while the shaft is inserted through a stack of conventional laminations 12 and the reduced weight laminations 14. Thus, a lighter motor with the same dimensions as a previous design may be constructed without having to provide a different fixture for constructing the motor. Of course, the outer laminations of the invention may be provided with slightly enlarged holes (by 0.060" or less) of the type described above as well.

Different punch cross-sections and stacking arrangements are shown in FIGS. 2A and 2B, 3A and 3B, and 4A and 4B. The cross-sections shown in FIGS. 2A, 3A, 4A, and 5A are staggered cross-sections taken along lines 2A, 3A, 4A, and 5A in the corresponding FIGS. 2B, 3B, 4B, and 5B, respectively. Because the lamination stack 16 in each case is automatically assembled in the die, it is possible to save costs by removing electrically unnecessary material from the rotor in regions internally embedded within the rotor, by controlling the punch pattern for selected laminations. Such savings would have been less practical to obtain without automatic assembly and stepping, which may be one of several factors that accounts for the absence of such cost saving measures in prior art rotor constructions.

Figure 2B:
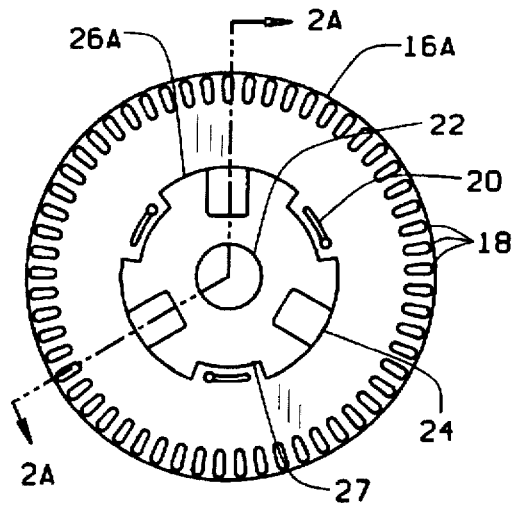

FIGS. 2A and 2B show a lamination stack 16 having a plurality of laminations 14A having a large central aperture 26A punched out. In this embodiment, the interlocks 20 in laminations 12A (which have holes 22 punched in their center rather than the larger apertures 26A) and 14A are spaced the same distance from the center of the laminations as the circumference of central aperture 26A. However, central aperture 26A is not round, but has notches 27 that provide at least ⅛"clearance for interlocks 20. This embodiment shows laminations 14A having a central aperture 26A at the outside of the stack 16. However, twenty laminations 12A with central holes 22 contacting the shaft (not shown) may be provided for stability and safety, if the laminations are of the standard 0.031" thickness.

Figure 3A:
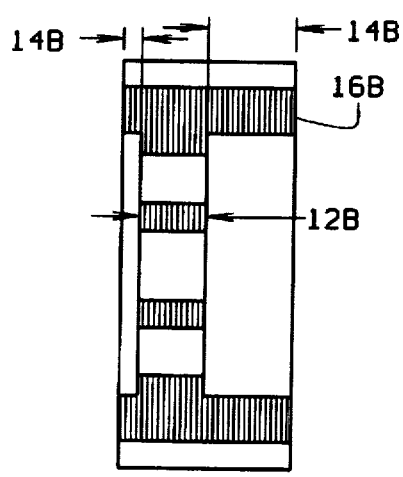
Figure 3B:
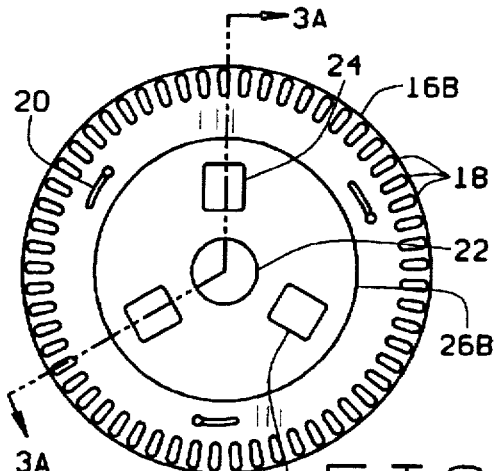

FIGS. 3A and 3B show a first variation of the design of FIGS. 2A and 2B in which laminations 12B, i.e., the laminations having the smaller central holes 22, are stacked together in the stack of laminations 16B, but where the laminations 14B having the larger central holes 26B are stacked in unequal quantities on either side of the group of laminations 12B. Also, in FIGS. 3A and 3B, the larger central holes 26B have an increased interior diameter than the larger central holes 26A of FIGS. 2A and 2B to provide greater weight savings and material recovery. Note in FIG. 3B that the interlocks 20 have been relocated more closely to the conductor slots 18 than in the laminations in FIG. 2B so that each lamination, including those with a larger central hole 26B can be properly stacked and skewed.

Figure 4A:
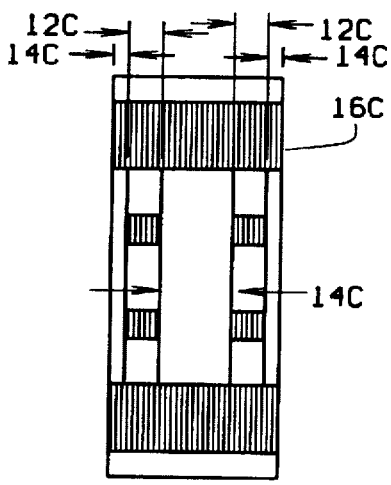
Figure 4B:
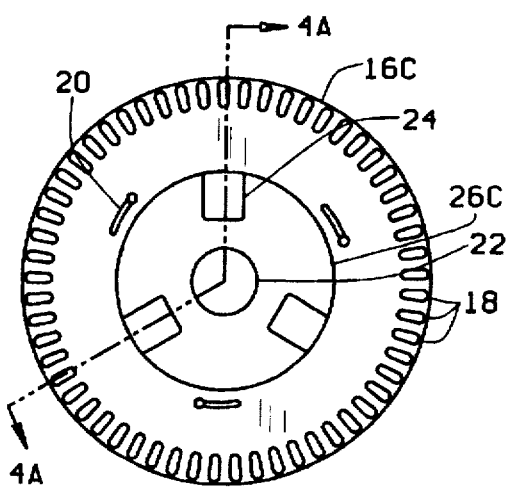

FIGS. 4A and 4B show yet another variation of the laminations 12C and 14C in that the laminations 12C having smaller central holes 22 are stacked in two groups separated by laminations 14C having larger central holes 26C, and additional laminations 14C are stacked on the outsides of the groups of laminations 12C, as well. Such an arrangement of laminations may provide greater stability in some applications. In addition, the larger central holes 26C are arranged in a manner similar to that of the larger central holes 26A in FIG. 2B, but no notches 27 are required because the interlocks 20 have been relocated relative to their positions in FIG. 2B.

Figure 5A:
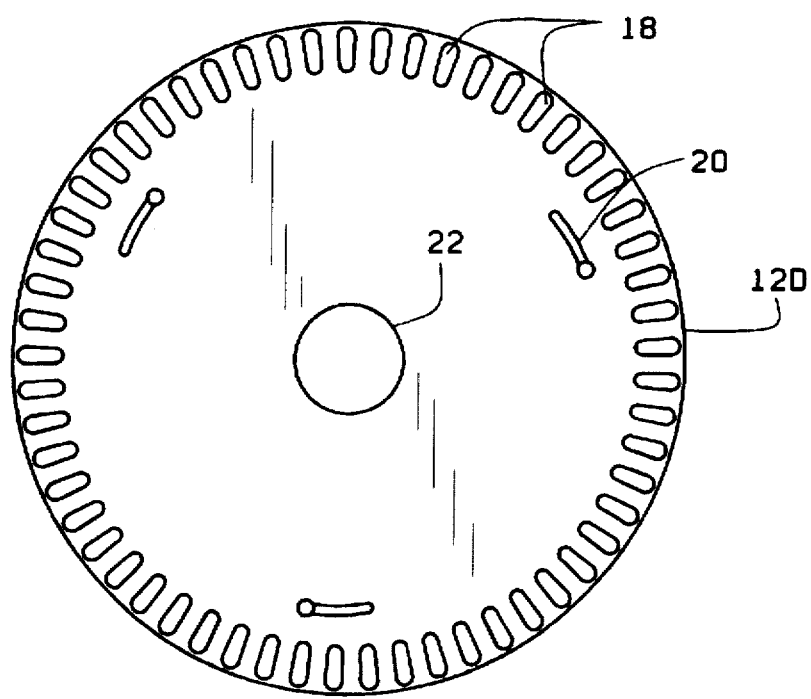
FIGS. 5A and 5B are, respectively, views of a primary and a weight-reduced lamination, sets of which may be used in a rotor in accordance with the invention.
Figure 5B:
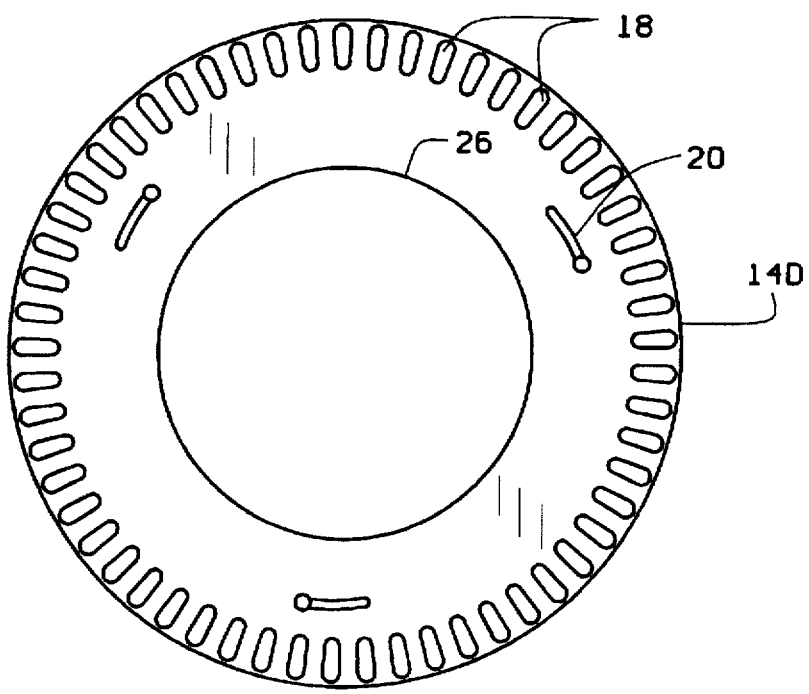

FIGS. 5A and 5B show additional embodiment of laminations that may be used in rotors in accordance with the invention. FIG. 5A shows a lamination 12D having a smaller central hole 22 than the lamination 14D, in FIG. 5B, with its larger central hole 26. Sets of laminations 12D and 12E may be used to produce reduced weight rotors, in a manner similar to that described above.

Figure 6A:
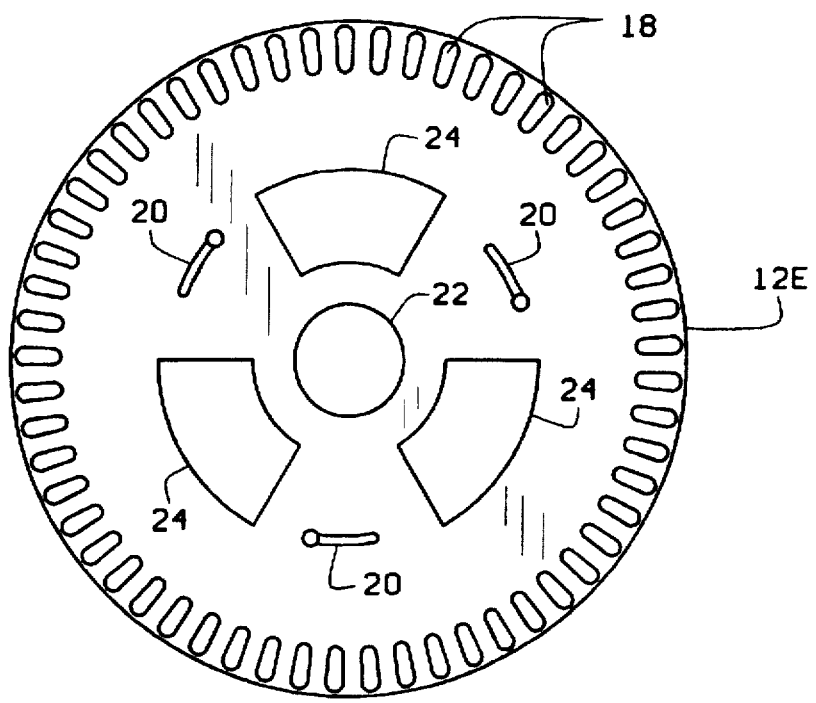
FIGS. 6A and 6B are, respectively, views of another primary and another weight-reduced lamination, sets of which may be used in a rotor in accordance with the invention.
Figure 6B:
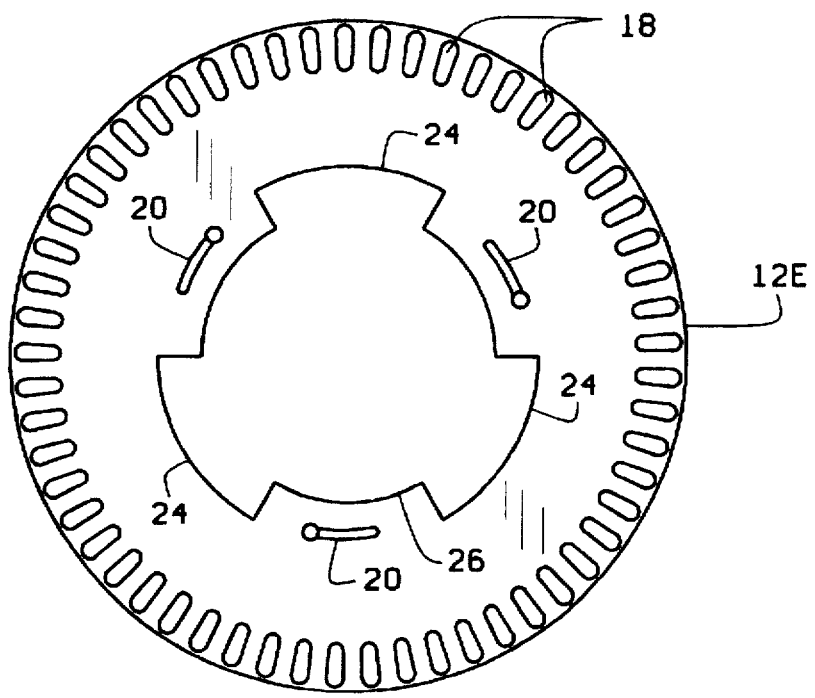

FIGS. 6A and 6B show additional lamination variants that may be used in rotors in accordance with the invention. Lamination 12E, shown in FIG. 6A, is essentially similar to lamination 12 in FIG. 1, except that interlocks 20 are positioned at a distance from the center of the lamination such that they are between vent holes 24. Lamination 14E, shown in FIG. 6B, is essentially similar to lamination 14 in FIG. 1, except that, to avoid encompassing interlocks 20 in counterbored hole 26, counterbored hole 26 is not made so large as to completely encompass vent hole 24.

Of particular note is the fact that, since the larger central holes 26 need not be circularly symmetrical, axial imbalance may be at least partially accommodated in some applications, such as those in which a crank is rotated (as in air conditioning applications), by counterbalancing the expected axial imbalance due to the crank with asymmetric punches in the rotor laminations that produce an off-axis center of gravity in some of the laminations. The punch press can also be operated so as to punch one or more additional holes (such as hole 30 in lamination 14' in FIG. 7A) to accomplish this purpose. In this case, center hole 22 for the shaft can, but need not, be identical in all laminations; e.g., an enlarged center hole can be used in conjunction with one or more off-center holes 30 to introduce imbalance or to further reduce the weight of the rotor.

Figure 7A:
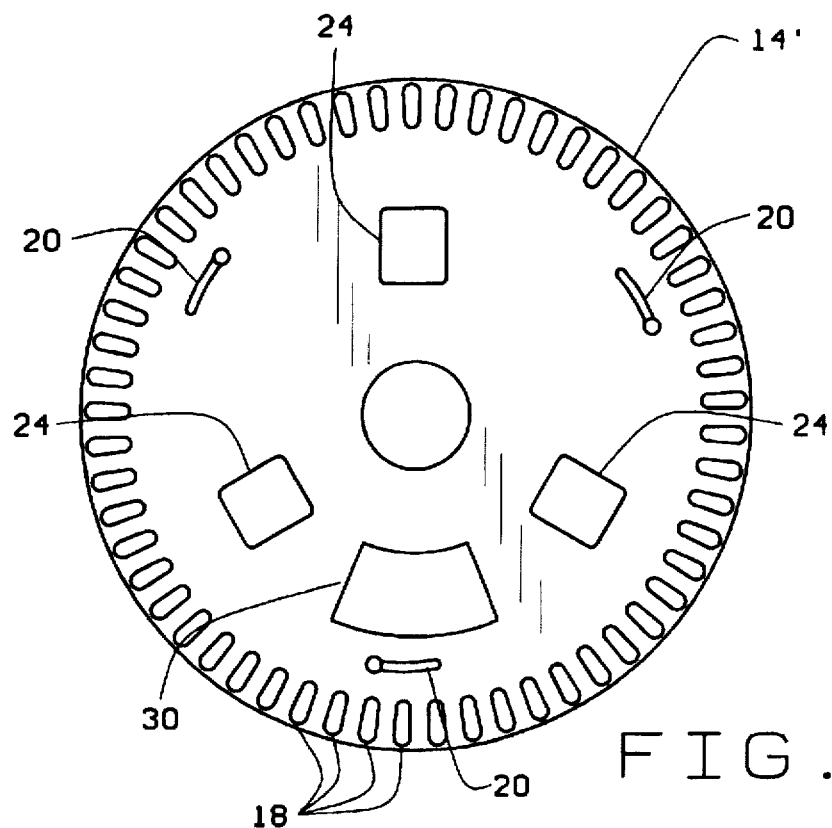
FIGS. 7A, 7B and 7C are views of asymmetrically punched laminations, sets of each of which may be used, in accordance with one aspect of the invention, to compensate for the axial imbalance of a crank such as may be found in reciprocating compressors as used in refrigeration or air conditioning units.

As will be clear to those skilled in the art, the amount of axial asymmetry can be controlled by controlling the amount of mass removed by hole 30, the size of the enlarged asymmetrical center hole (if one is punched—none is shown in FIG. 7A), or by the number of laminations 14' used in the rotor stack, or by any combination of these factors. Thus, the invention provides a way for axial imbalance to be compensated by reducing, rather than increasing, the weight of a motor.

Figure 7B:
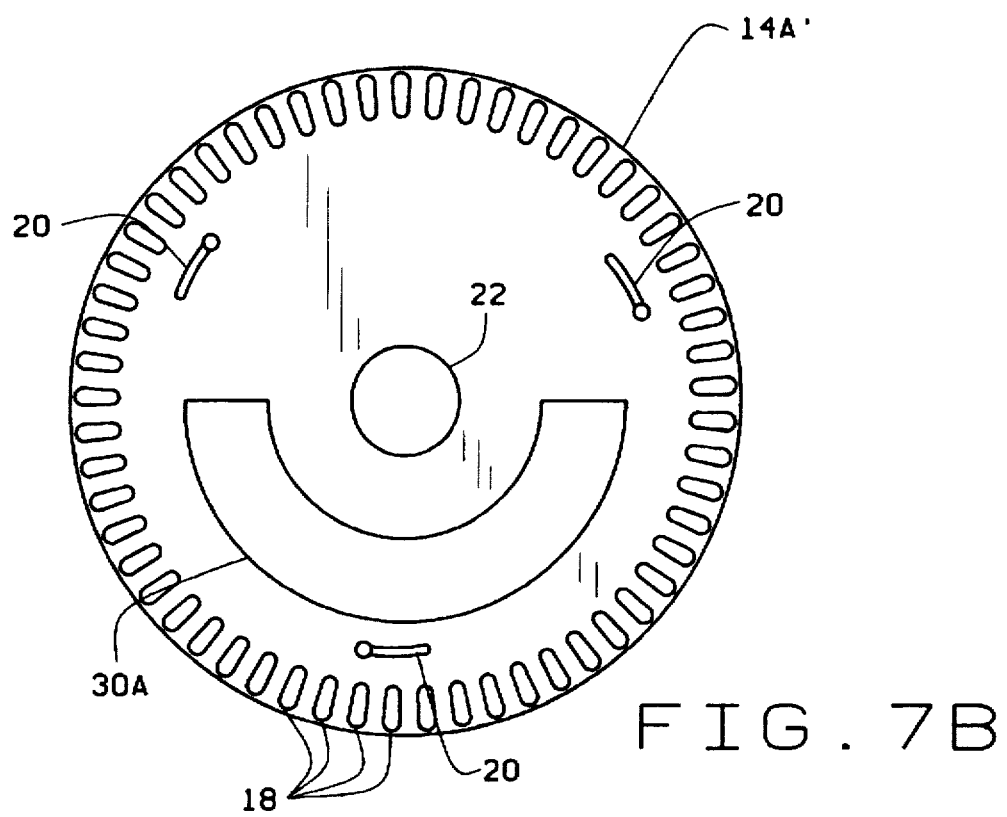
Figure 7C:
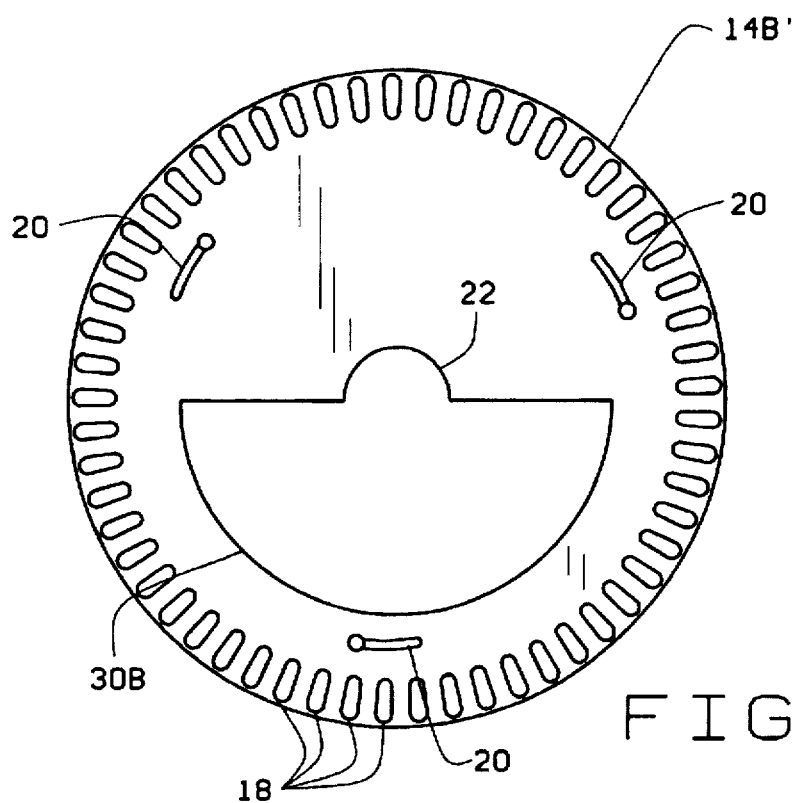

FIGS. 7B and 7C show additional variations of rotor laminations that may be used as reduced-weight laminations in rotors designed to accommodate axial imbalance. FIG. 7B shows a lamination 14A' having no vent holes, and having a crescent-shaped compensating punch 30A, while FIG. 7C shows a lamination 14B' that is similar to lamination 14A' except that a semicircular punch 30B is used to accommodate the asymmetry, the compensating punches in the laminations being positioned and aligned within the lamination stack to provide the required compensation. Other shapes and sizes of compensating punches could, of course, be used, the sizes and shapes of which, together with the numbers of such laminations, being determined by the amount of asymmetry to be compensated. It should be noted that the weight reduction techniques in accordance with the invention are particularly suitable for hermetic motors when no vent holes are provided in the laminations, because no through holes for air circulation are created in the rotor stack when a combination of weight-reduced and non-weight reduced laminations without vent holes are used in a rotor stack. Thus, if axial asymmetry is to be balanced in a hermetic motor, the laminations shown in FIGS. 7B or 7C are particularly suitable when used in combination with laminations such as that shown in FIG. 5A, i.e., laminations without vent holes.

Figure 8:
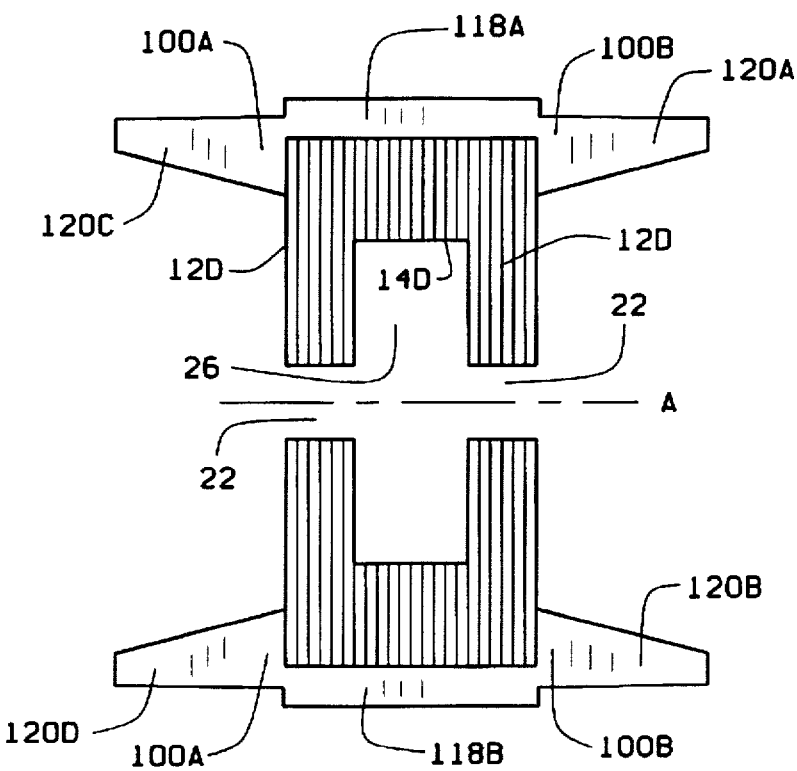
FIG. 8 illustrates a cross-section of a typical induction motor rotor in accordance with the invention.

FIG. 8 shows a cross-section of a typical induction motor rotor comprising sets of laminations, one set comprising laminations 12D as shown in FIG. 5A and the other set comprising laminations 14D as shown in FIG. 5B. For clarity, the illustration in FIG. 8 does not include a shaft and does not show anything that does not actually intersect the plane of the cross-section, which includes axis A of the rotor. This cross-section intersects rotor bars 118A and 118B, which go through respective sets of rotor slots 18 in the laminations 12D and 14D. Also shown are the portions of the two shorting end rings 100A and 100B on opposite sides of the stack of laminations (but only the portion actually intersecting the plane of the view); and optional fan blades 120A, 120B, 120C, and 120D. (Other optional fan blades may be included, but do not intersect the plane of the cross-section, and are therefore not shown.) The shaft would completely fill holes 22, leaving a void defined by holes 26 in a central region of the rotor lamination stack. This region, could be used to effect a significant weight reduction, even in a hermetic motor, because it is not in communication with any through holes in the rotor stack.

It should be noted that the invention is not limited to the particular configurations illustrated herewith, but that many possible configurations are possible, including, but not limited to, those with more than two types of differently punched laminates, and/or stacking arrangements other than those illustrated.

While the invention has been described in reference to certain specific embodiments, it will be recognized that these embodiments are intended for illustration only. Upon reading the specification, one skilled in the art would understand that numerous adaptations of the invention are possible without departing from the spirit of the invention. For this reason, the scope of the invention is to be limited only by reference to the claims below rather than by the specific examples given in the specification.

What is claimed is:

1. A laminated rotor comprising:

a shaft having a center axis, the shaft being adapted to receive a set of laminations mounted axially thereon; and a plurality of laminations of a ferro-magnetic material mounted axially on the shaft, said laminations each having an outer periphery and a central hole;

said plurality of laminations comprising at least a first group and a second group, wherein each of the laminations in the second group of laminations has a weight less than that of each of the laminations in the first group, and the central hole of each lamination in said first group has a cross-section conforming to a cross-section of said shaft on which said laminations are mounted, and the central hole of each lamination in said second group is dimensioned such that said shaft is not engaged by the central holes of said second group.

2. The laminated rotor of claim 1 wherein each of the laminations in the second group of laminations has a weight not greater than 95% of that of each of the laminations in the first group.

3. The laminated rotor of claim 2 having at least one punched lamination in the second group having a center axis and a center of gravity of the at least one punched lamination being offset substantially from its center axis.

4. The laminated rotor of claim 1 wherein each of the laminations in said second group is the same as each of the laminations in said first group except for the size and shape of the central holes of the laminations of said second group being different from the size and shape of the central holes of the laminations of said first group resulting in each of the laminations of the second group weighing less than each of laminations of the first group.

5. The laminated rotor of claim 1 wherein each of the laminations in at least the first group has a plurality of additional vent holes, each vent hole having edges separated from the central hole, the interlocks and the conductor slots, and the plurality of vent holes in the plurality of laminations stacked about the rotor form an air passageway from a first end of the stack to a second end of the stack through the vent holes.

6. The laminated rotor of claim 5 having at least 14 laminations in the first group of laminations.

7. The laminated rotor of claim 6 having at least 20 laminations in the first group of laminations.

8. The laminated rotor of claim 7 having at least 28 laminations in the first group of laminations.

9. The laminated rotor of claim 5 wherein the laminations of the first group of laminations are arranged on the rotor entirely between the laminations of the second group of laminations.

10. The laminated rotor of claim 5 wherein the laminations of the second group of laminations are arranged on the rotor entirely between the laminations of the first group of laminations.

11. The laminated rotor of claim 5 wherein the laminations of the first group of laminations and laminations of the second group of laminations are arranged alternately on the rotor.

12. The laminated rotor of claim 1 wherein the central hole in each lamination of the second group of laminations is circularly asymmetric, so that the rotor has a center of gravity substantially offset from the center axis of the shaft.

13. The laminated rotor of claim 12 wherein the rotor is contained in an induction motor.

14. The laminated rotor of claim 13 wherein the shaft of the rotor is mechanically coupled to a crank.

15. The laminated rotor of claim 14 wherein the center of gravity of the rotor is offset to counterbalance the crank when the rotor is rotating.

16. The laminated rotor of claim 1 wherein each of the laminations in said second group has a weight not greater than 75% of the weight of each lamination in said first group.

17. The laminated rotor of claim 1 wherein each of said plurality of laminations includes a plurality of interlocks spaced from said conductor slots.

18. A laminated rotor for an induction motor, said laminated rotor comprising:

a shaft having a center axis, the shaft being adapted to receive a set of laminations mounted axially thereon; and a plurality of laminations of a ferro-magnetic material mounted axially on the shaft, said laminations each having an outer periphery and a central hole;

said plurality of laminations comprising at least a first group and a second group, wherein each of the laminations in the second group of laminations has a weight less than that of each of the laminations in the first group, wherein each of the laminations in the second group of laminations has a weight not greater than 95% of that of each of the laminations in the first group, and wherein the central hold of each lamination in said first group has a cross-section conforming to a cross-section of said shaft on which said laminations are mounted, and the central hole of each lamination in said second group is dimensioned such that said shaft is not engaged by the central holes of said second group.

* * * * *